Dec. 30, 1958 R. C. FISHER 2,866,372
BOLT NON-ROTATIVELY SECURED TO PLATE BY STRUCK OUT SHANK PORTION
Filed Oct. 6, 1954
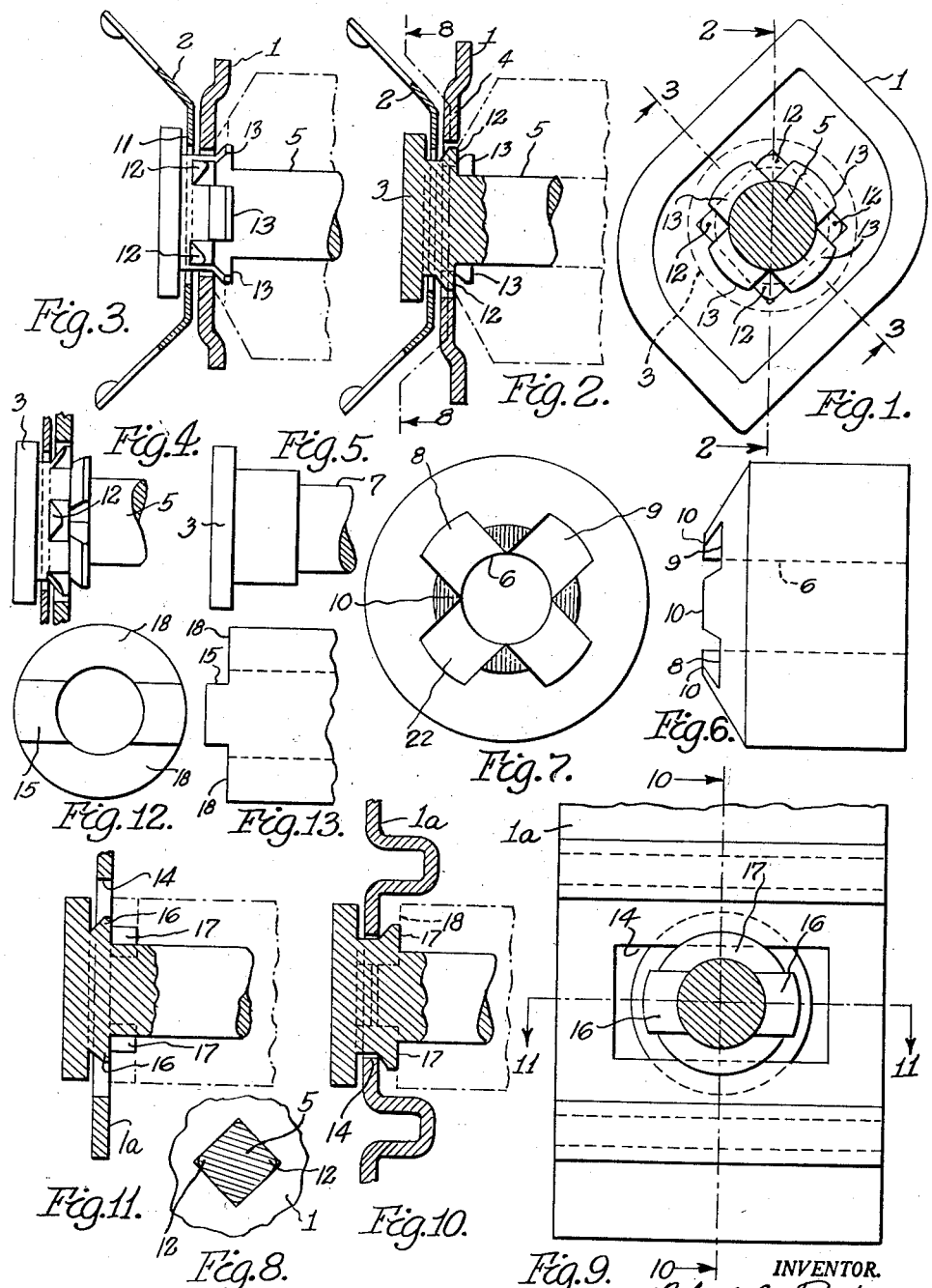
INVENTOR.
Robert C. Fisher
BY
Barnes, Kisselle, Laughlin
& Raisch

United States Patent Office 2,866,372
Patented Dec. 30, 1958

2,866,372

BOLT NON-ROTATIVELY SECURED TO PLATE BY STRUCK OUT SHANK PORTION

Robert C. Fisher, Birmingham, Mich., assignor to Fisher Industries, Inc., Ferndale, Mich., a corporation of Michigan Application October 6, 1954, Serial No. 460,634

1 Claim. (Cl. 85—9)

This invention relates to fasteners, particularly fasteners for bolting molding on a body such as an automobile body. It is the object of the present invention to provide a novel fastener made by a new double function die and by a new method for fastening clips or plates of the fastener to the bolt head loosely enough to take a stamped metal spring stress member. This is all done in one punching operation.

With the heavy and large pieces of ornamental molding that are now used on automobile bodies it is advisable and in many cases necessary to use the bolt type of fasteners to securely bolt the molding to the body. A common form of bolt fastener that now is in general use is the so-called turnable fastener. It involves a plate provided with a square hole and a bolt that has an enlarged square shank between the thread and the head. When the bolt is inserted in the square hole, this makes the bolt non-rotatable in the plate or shell. The unthreaded square portion of the bolt is a calculated amount longer than the movement of the punch so that after it strikes the head of the bolt and drives it into a die below the plate, the central edge of the die catches the corners of the square portion of the shank and stakes the shouldered portion of the shank against the underside of the plate and thereby loosely secures the bolt to the plate. But, inasmuch as the travel of the punch is less than the length of the squared portion of the shank, this leaves clearance between the bolt head and the other side of the plate. This clearance is sufficient to accommodate a spring-armed stress washer. This is put in place before the punching operation takes place.

These turnable molding fasteners are narrow enough so that they can be passed through the opening between the edges of the turned-back flanges of the molding. Then the plate or shell is turned so that the length lies crosswise of the molding. The nut is then turned down to anchor the fastener in place. This fastener is described and claimed in these patents: U. S. Pat. No. 2,531,348 Amerbury, and U. S. Pat. No. 2,531,351 Churchill.

However, this fastener requires a square shank portion which is difficult to thread into the plate and die when setting up the plate, the bolt and the stress washer for the punching operation. If this setting up is done as a hand operation, the operator has to take the pains to turn the squared portion so it will register with the squared openings in the plate and the washer and then push it in place. If the bolts are automatically fed from a hopper by a chute to be dropped into the work, this requires two station operations.

I have designed a two purpose die and a new product which spurs extruded from a round shank for keying the bolt to the plate so that it will not rotate and with flanges taken from the shank so as to retain the bolt loosely in the plate but with a clearance necessary to take the stress washer.

I use a bolt with an enlarged round shank as contradistinguished to the square shank. This results in considerable saving in the labor in setting up the bolts in the spring washer and plate for the punching and die operation. If this is done manually, the operator can thread the bolts into the openings in the plates and washers with very much less difficulty than threading square shank bolts into a square opening in the plate. The round bolts speed the assembly. If the feeding of the bolts is an automatic feed from a hopper, it simplifies the operation and makes it much more reliable. The hopper-fed square bolts require two station operations in the machine. First the bolts are slid down a chute and directed into the openings in the spring washer and the plate and in the die but the squared portion or shoulder sits on top of the washer and the plate. Then the machine passes this assembly to another station where a piece of apparatus takes hold of the bolt and turns it so that the squared portion of the bolt registers with the squared openings in the spring washer and the plate and it drops in place. This requires expensive machinery to perform the operations and furthermore the guiding mechanism often fails to line up the square shanks for the holes and they are struck by the punch in this unregistered position, thereby driving the shoulder through the metal surrounding the square opening and thereby permanently locking the bolt to the plate and making the fastener useless.

What I propose to do is to use a round shank bolt and with one operation of the punch and die set both key the bolt to the fastener plate and also turn-over tabs to loosely retain the bolt in the plate.

Referring to the drawings:

Fig. 1 is an elevation of the fastener plate and a section through the bolt showing the bolt keyed to the plate and with the tabs turned over to retain the plate and bolt together.

Fig. 2 is a section on the line 2—2 of Fig. 1.

Fig. 3 is a section on lie 3—3 of Fig. 1 taken at a position 45 degrees removed from where the 2—2 section is taken.

Fig. 4 is an elevation and section looking at the molding fastener assembly at a position 45 degrees from the Fig. 3 view.

Fig. 5 is a fragmentary view of the bolt with the round shank.

Fig. 6 is a side elevation of the die I use.

Fig. 7 is a plan view of the same.

Fig. 8 is a section through the bolt after it has been secured to the fastener plate.

Fig. 9 is an elevational view of a fastener plate embodying a modified form of the invention.

Fig. 10 is a section taken on the line 10—10 of Fig. 9.

Fig. 11 is a section taken on the line 11—11 of Fig. 9.

Fig. 12 is a top elevation of the die used in the operation of uniting the parts of this modified form of the fastener.

Fig. 13 is a side elevation of this die.

1 designates the stamped metal plate which is inserted lengthwise in the opening between the two flanges of the molding and then turned around to anchor itself under the flanges of a molding when the nut is turned down on the bolt. 2 is an armed spring stress washer which is secured between a head 3 of a bolt and the boss 4 of the fastener. A non-circular hole, preferably square, is punched in the plate as the plate is formed and cut from a ribbon of metal. The threaded shank of the bolt is placed in the central opening 6 of the die with the plate and stress washer on top of the die. This plate opening at its narrowest dimension is only slightly larger than the diameter of the unthreaded portion 7 of the bolt.

The die has machined therein two cross channels 8 and 9. This leaves between the channels four lands 10. When the punch comes down and thrusts the bolt into the die, these pointed lands plow into the shoulder of the enlarged portion of the shank and cause the metal to flow into the recesses or spaces around the bolt formed by the non-circular shape of the hole. The amount of metal taken by these lands and caused to flow into the recesses is nicely calculated so that the bolt is only loosely keyed in the recesses so while it can't turn, the assembly is thus a loose one so that the bolt can rock in the plate. This permits the clamp to have some flexibility to adjust itself to the surrounding parts when it is clamped in place by turning the nut on the bolt. If a tight bolt and plate is desired, the bolt head can be hit harder or the lands placed closer together.

It will be noticed by comparing Figs. 3 and 4 that there is considerable clearance or space 11 between the head of the bolt and the plate 1. This clearance not only accommodates the stress washer 2 but also permits the rocking movement to permit the fastener to adjust itself to the surrounding media when anchored in place. These keys or spurs are nicely shown at 12 in Fig. 3. Here they are viewed without the recesses. Note the spur 12 in Fig. 4. The die has a second level or lands 22 formed by the cross channels. These come in contact with the undisturbed unthreaded portion of the shank and cause the metal to flow under the plate between the spurs forming the tabs 13, four of them. These are retainers for retaining the bolt from dropping out of the plate and the stress washer assembly.

So here in one punching operation the high level lands of the die take the metal out of the enlarged unthreaded portion of the bolt and cause it to flow into the spaced offset from the round bolt shank. Then the low level channel portions or low level lands catch the unplowed remaining portions of the shoulder and stake this out to form the tabs 13.

The form of the invention shown in Figs. 9 to 13, inclusive, involves the use of a fastener plate 1a with an elongated opening 14. This is for the purpose of providing a bolt that may shift some distance to accommodate itself to the surroundings it finds in the molding and the body. Here the land or the high level of the die is the elevated land 15. This is at the center of the die and this leaves the low level lands 18 at the sides of the land 15. When the assembled parts are placed over and in the die, the punch comes down on the bolt head and drives the enlarged, unthreaded portion of the shank into the die shown in Fig. 12. The lands 15 cause the keys 16 to be formed and the low level lands 18 strike the undisturbed portion of the shoulder and form the flanges or tabs 17 which loosely hold the bolt in the assembly.

This application is a division of my prior application Serial No. 414,724, entitled "Molding Fastener and Method and Die for Assembling the Same," filed March 8, 1954, now Patent No. 2,761,209.

What I claim is:

A fastener for moldings or other articles having in combination a plate with a non-circular perforation and a bolt having a threaded shank portion, a circular unthreaded shank portion and a head, the circular unthreaded portion being between the head and threads and of larger diameter than the threaded portion and being of less diameter than the narrowest dimension of the perforation in the plate, the unthreaded portion having small spurs or keys plowed out for engaging in the spaces between the unthreaded shank and the non-circular portions of the hole around the bolt due to some cross sections of the perforation having substantially greater width than the unthreaded portion of the bolt and having at a level spaced from the head more than the thickness of the plate tabs plowed out from all the undisturbed portions of the unthreaded shank between the spurs or keys and turned over to form wide tabs to hold the bolt in place.

References Cited in the file of this patent

UNITED STATES PATENTS

| | | |
|---|---|---|
| 1,579,359 | Hallenbeck | Apr. 6, 1926 |
| 1,822,657 | Horton | Sept. 8, 1931 |
| 2,270,813 | Olson | Jan. 20, 1942 |
| 2,531,348 | Amesbury | Nov. 21, 1950 |
| 2,695,435 | Bedford | Nov. 30, 1954 |
| 2,713,186 | Borowsky | July 19, 1955 |
| 2,761,209 | Fisher | Sept. 4, 1956 |

FOREIGN PATENTS

| | | |
|---|---|---|
| 436,706 | Great Britain | Oct. 16, 1935 |